Oct. 14, 1941.                J. L. ANDERSON                2,258,670
                      SPEED CONTROL OF TORCH CARRIAGES
                           Filed May 2, 1940                2 Sheets-Sheet 1

INVENTOR
James L. Anderson
BY J. F. Brandenburg
ATTORNEY

Oct. 14, 1941.  J. L. ANDERSON  2,258,670
SPEED CONTROL OF TORCH CARRIAGES
Filed May 2, 1940  2 Sheets-Sheet 2

INVENTOR
James L. Anderson
BY J. F. Brandenburg
ATTORNEY

Patented Oct. 14, 1941

2,258,670

UNITED STATES PATENT OFFICE 2,258,670

SPEED CONTROL OF TORCH CARRIAGES

James L. Anderson, Closter, N. J., assignor to Air Reduction Company, Incorporated, New York, N. Y., a corporation of New York Application May 2, 1940, Serial No. 332,929

16 Claims. (Cl. 113—59)

This invention relates to the moving of a torch, such as a welding torch, across a work-piece or along a joint, and the invention relates more particularly to method and apparatus for controlling the speed with which the torch moves, and for effecting the control automatically.

For various torch operations such as cutting, flame machining, flame hardening, or welding, it may be desirable to change the speed of translation of the torch during an operation. This invention will be described as a method and apparatus for welding, but in its broader aspects the invention is not limited to welding.

It is an object of the invention to provide an improved method for changing a torch speed during a welding or other torch operation. This object is attained by holding a governor against a yielding pressure and shifting the holding means when the torch reaches predetermined points along its course of travel.

Another object of the invention is to provide improved speed-adjusting mechanism for changing the rate of travel of a torch carriage as it reaches certain positions during the operation of the torch over the work. The invention comprises a self-propelled torch carriage with a governor-controlled motor, and a spring or other yielding means urging a governor adjustment in one direction, and cam means holding the governor adjustment against the force of the spring.

More specifically the invention comprises a cam extending lengthwise along the course traversed by the torch carriage, and follower apparatus associated with the carriage and controlled by the cam to change the adjustment of the carriage motor governor.

One feature of the invention relates to crossseam welding by which new lengths of strip material are joined successively to the end of another strip to obtain longer lengths or to maintain a supply of continuous strip to forming or welding equipment. This invention makes such welds more effectively and more efficiently by moving the carriage quickly into position to start the weld, slowly at the beginning of the weld when there is cold metal ahead of the torch, faster as the metal along the seam heats up, and at maximum speed to avoid burning the end of the weld as the torch approaches the far edge of the sheet.

Other objects, features and advantages of the invention will appear or be pointed out as the specification proceeds.

In the accompanying drawings, forming part hereof:

Figure 1:
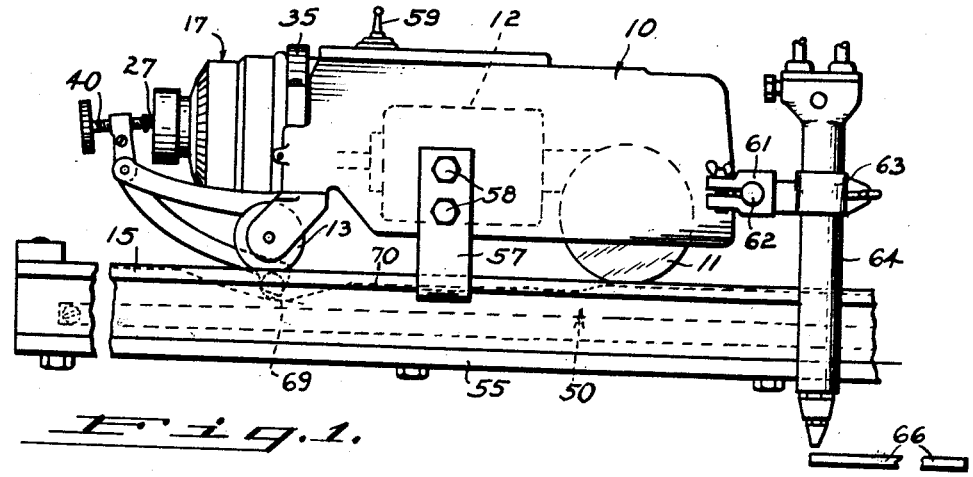
Fig. 1 is a side elevation of welding apparatus embodying the invention.

A torch carriage 10 has traction wheels 11 at its forward end driven by a motor 12 through suitable reduction gearing. There are idler wheels 13 at the rearward end of the carriage. In the illustrated embodiment of the invention, the wheels 11 and 13 run in grooves in a supporting plate 15 which comprises the track for guiding the course of the carriage. Other wheel shapes and different types of track can be used if desired.

Figure 2:
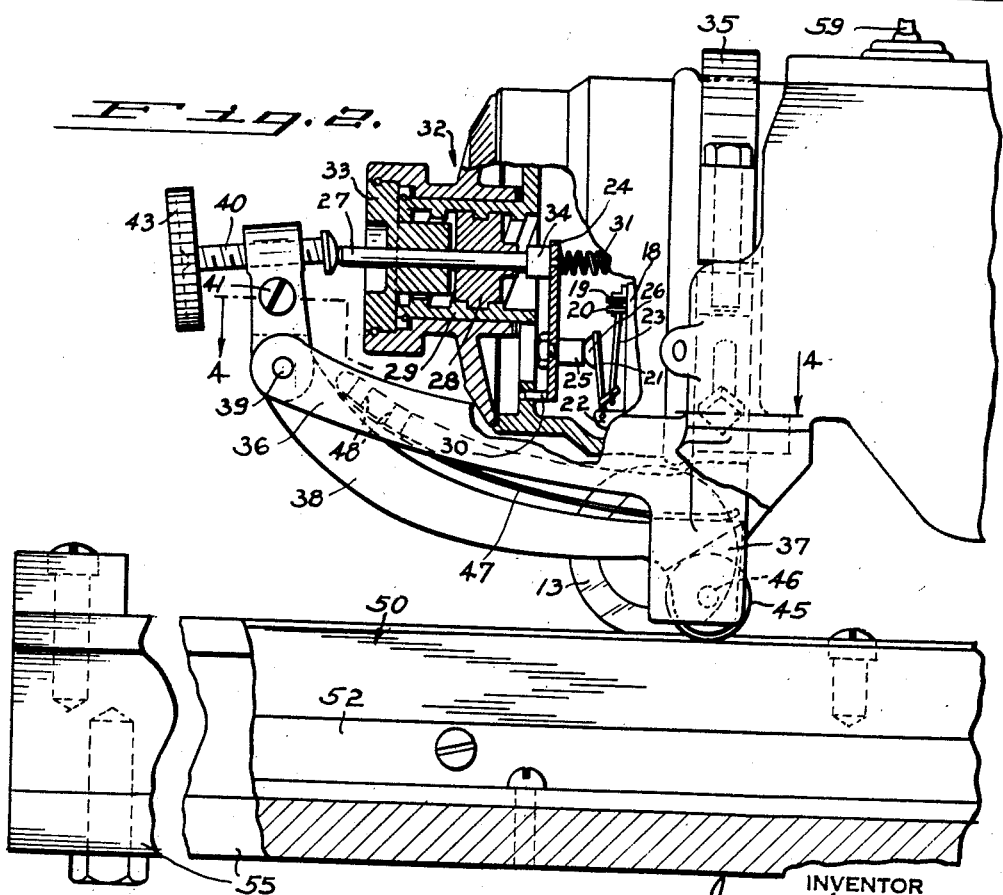
Fig. 2 is an enlarged detail view, partly in section, showing the governor adjusting mechanism of Fig. 1, with the follower on a high part of the cam.

The speed of the motor 12 is controlled by a centrifugal governor 17. This governor includes a disk 18 (Fig. 2) that is rotated by the motor and that carries spring contact arms 19, 20 which make and break the speed-control circuit of the motor in response to changes in the rate of rotation of the motor. A bell crank 21 is pivotally supported from the disk 18 by lugs 22 and the bell crank is connected by a link 23 with one of the contact arms for controlling the speed at which the contact arms open the circuit.

Centrifugal governors of this type are well known and a detailed description of such a governor is not necessary for a full understanding of this invention. (A centrifugal governor is described in the Evans Patent No. 2,032,743, dated March 3, 1936.) It is sufficient to understand that movement of the upstanding arm of the bell crank 21 to the right in Fig. 2 makes the governor become effective at lower motor speed.

An arm 24 has a fiber button 25 that contacts with a bearing 26 on the upper end of the bell crank 21. The arm 24 is connected to the forward end of a round plunger 27 that is slidable lengthwise in an adjusting member or plug 28. This plug 28 has threads which engage an internally-threaded extension 29 of the governor housing. The arm 24 has a prong 30 that extends into an opening in the end wall of the governor housing to prevent the arm 24 from turning. A compressed spring 31 urges the arm 24 and plunger 27 outward (toward the left in Fig. 2).

A cover 32 fits over the outside of the extension 29 and is rotatable on this extension as a bearing. There is a knob at the end of the cover 32, and an insert 33 pressed into the open end of the knob has a tongue that extends into a slot in the threaded plug 28. This tongue transmits rotation of the cover 32 to the plug 28 to cause the plug to screw one way or the other in the threaded extension 29.

An enlarged end or collar 34 on the inner end of the plunger 27 comes against the end of the plug 28 to limit the outward movement of the plunger 27. Adjustment of the plug 28 lengthwise along the threaded extension 29, therefore, limits the maximum speed of the carriage motor since it is the outward movement (toward the left in Fig. 2) of the plunger 27 under the pressure of the spring 31 that causes the governor to increase the motor speed.

There are graduations on the outside of the cover 32 around that edge of the cover which is closest to the end wall of the governor housing, and these graduations (best shown in Fig. 3) are used to indicate the maximum speed setting of the governor adjusting means.

A clamp 35 fits over the governor housing and has a rearwardly extending bracket 36, and two downwardly extending guides 37. A rocker arm 38 is supported between spaced lugs at the rearward end of the bracket 36 by a pivot pin 39. The upper end of the rocker arm 38 is a split clamp with a threaded opening through which a governor-adjusting screw 40 extends. A screw 41 can be tightened to cause the split upper end of the rocker arm to clamp the adjusting screw 40 more tightly and increase the friction that holds the governor-adjusting screw 40 in any set position.

The governor-adjusting screw 40 has a contact face at its forward end bearing against the end of the plunger 27. There is a knob 43 at the other end of the governor-adjusting screw for turning the screw by hand to obtain the desired adjustment of the governor for a given position of the rocker arm 38.

The lower end of the rocker arm 38 is bifurcated and extends between the guides 37 which prevent any lateral displacement of the rocker arm and its cam-follower roller 45. The roller 45 turns on an axle 46 extending between the bifurcations at the lower end of the rocker arm. A leaf spring 47 is fastened at its upper end to the under side of the bracket 36 by screws 48, and the other end of the spring 47 bears against the top of the rocker arm 38 to hold the cam-follower 45 down and against the surface of a cam 50. The leaf spring 47 is of sufficient strength to push the cam-follower roller 45 against the cam 50 and force the plunger 27 inward against the force of the spring 31. The governor adjustment means has a bias, therefore, urging it in a direction to decrease the motor speed, and the cam 50 provides an opposing force that holds the adjustment means against the force of this bias which is caused partly by the leaf spring 47 and partly by the unbalanced weight of the cam-follower roller 45 and long arm of rocker arm 38. Both the spring and unbalanced weight comprise yielding means subject to displacement by any rises in the cam 50.

If the screw 40 and the threaded plug 28 are so adjusted with relation to one another that the screw 40 is away from the end of the plunger 27 when the roller 45 is on a high part of the cam, then it is the position of the threaded plug 28 that determines the high speed of the carriage instead of the extent of the rise of the cam.

Ordinarily, however, the cover 32 is set so that the enlarged end 34 of the plunger 27 never touches the plug 28, and the governor adjustment depends entirely upon the position of the cam-follower roller.

Figure 3:
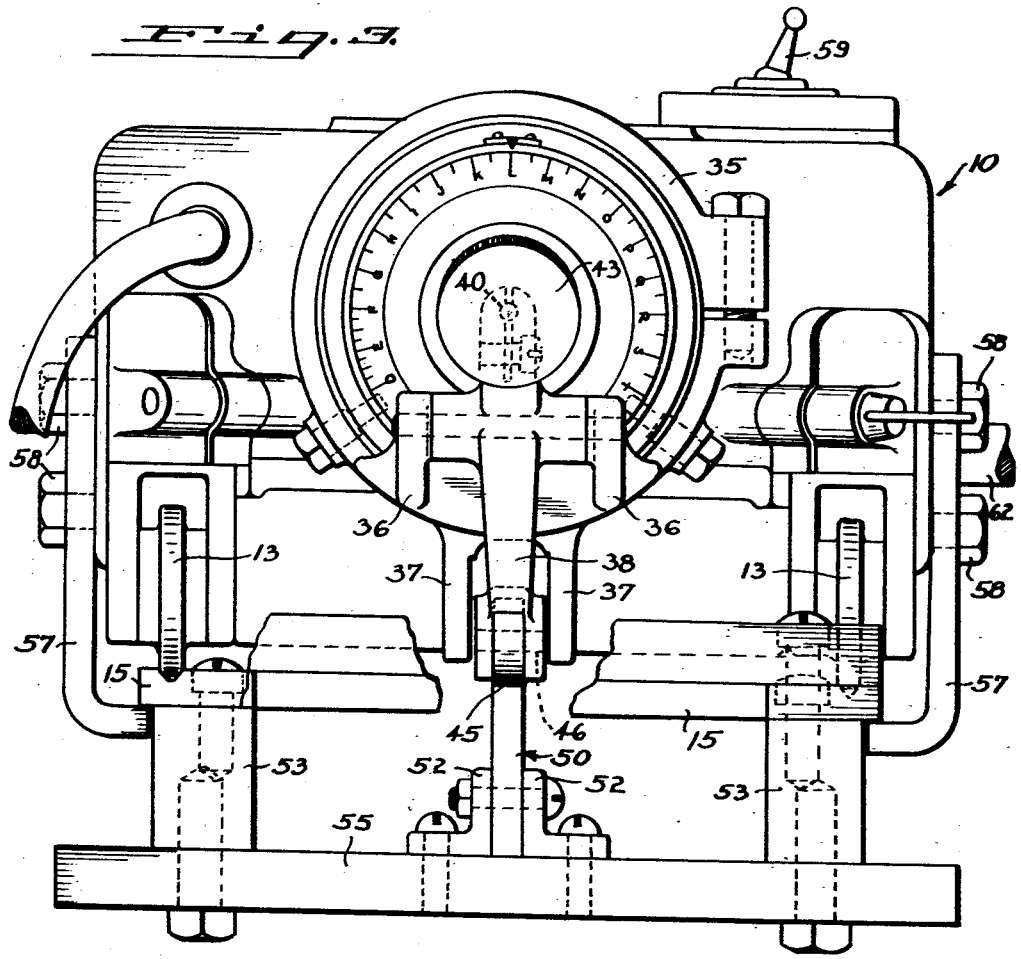
Fig. 3 is a rear elevation of the apparatus shown in Fig. 2.
Figure 4:
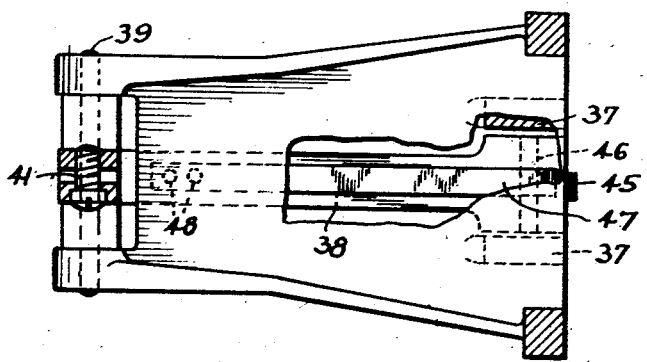
Fig. 4 is a sectional view taken on the line 4—4 of Fig. 2.

Longitudinally extending angles 52 hold the cam 50 midway between and parallel to the grooves in the plate 15. The location of the cam between these grooves that serve as the track for the carriage is best shown in Fig. 3. The supporting plate 15 is connected by screws to spacer blocks 53 that are fastened to a base 55. The angles 52 are connected to this same base 55.

A safety bar 57 secured to each side of the carriage body by screws 58 extends inward under the edge of the plate 15 and protects the carriage from tipping over in the event of excessive cantilever loading, as, for example, when an attendant presses downward too heavily on a torch while adjusting a valve, or the position of the torch in its holder.

There is a switch 59 on top of the carriage body for controlling the operation of the motor. The switch 59 has three positions for causing the motor to run forward, backward, or to stop.

A clamp 61 at the forward end of the carriage 10 holds a bar 62 which extends beyond the side of the carriage to provide a support for a torch holder 63. A welding torch 64 is clamped in the torch holder 63, but is vertically adjustable in the torch holder to obtain the desired spacing of the torch over a joint between a strip 66 and an abutting strip to which it is to be welded.

The cam 50 is high at its left-hand end (Fig. 1) and then slopes downward to a low point 69. As the cam-follower roller 45 moves downward to the low point 69, the governor adjusting screw 40 moves toward the right and the plunger 27 is moved inward by the pressure of the leaf spring 47 and the force of the unbalanced weight of the rocker arm 38. This change in the governor adjustment causes the carriage to move at slower speed.

The cam 50 is located in such relation to the strip 66 (Fig. 1) that the cam-follower roller 45 is at the low point 69 of the cam when the torch 64 is at the beginning of the joint or seam to be welded. This means that the carriage 10, after moving the torch rapidly toward the position where the weld is to begin, slows down and causes the torch to start the weld at slow speed. This is advantageous because at the beginning of the welding operation heat is lost by conduction to the cold metal ahead of the torch.

As the carriage continues to advance, the cam-follower travels from the low point 69 up an incline of the cam to a flat portion 70 which is of intermediate height and which holds the governor adjustment in the position that obtains the desired speed of translation of the torch for welding after the metal ahead of the torch has been heated by conduction from the region of welding.

The welding continues at uniform speed until the torch 64 gets close to the end of the joint or seam. When the torch reaches such a position the loss of heat by conduction into the metal ahead of the torch decreases rapidly as the amount of metal between the torch and the end of the joint decreases. In order to avoid the danger of overheating the end of the weld, and in order to utilize the apparatus to the best advantage, the cam 50 has an upward slope which changes the governor adjustment in a direction to increase the carriage speed progressively to a maximum as the torch approaches the far edge of the strip (the right-hand edge in Fig. 1).

Upon completion of the weld the torch 64 is shut off and the switch 59 operated to reverse the direction of movement of the carriage. Since the carriage returns to its starting position with the torch shut off, it makes no difference whether the speed of the carriage during the return trip is variable or constant. If the cam-follower roller 45 is allowed to run on the cam, the speed will, of course, vary, but an attendant can run the carriage back rapidly by holding the rocker arm 38 with the cam-follower in raised position.

When the carriage returns to its starting point, the switch 59 is moved into its neutral position and the carriage remains stationary until the time comes to weld a new length to the end of the strip. The torch is then lighted, the switch 59 pushed into forward position, and the carriage travels rapidly toward the strip until the cam-follower 45 comes to the downward slope of the cam leading to the low point 69. As the cam-follower approaches the low point 69, the carriage slows down preparatory to the beginning of the welding operation already described.

The preferred embodiment of this invention has been described, but it will be understood that terms of orientation are relative, and the invention is not limited to welding operations. Various changes and modifications can be made in the illustrated embodiment, and some features of the invention can be used without others.

I claim:

1. In a self-propelled torch carriage having a motor and a governor for controlling the motor speed, a governor adjustment for changing the speed at which the governor becomes effective, yielding means urging the governor adjustment in one direction, and cam-follower means associated with the governor and constructed and arranged to cooperate with cam means located along the course of the carriage for moving and holding the governor adjustment against the force of said yielding means.

2. The combination with a motor governor on a self-propelled torch carriage, of a governor adjusting device that can be set to limit the motor to any desired speed within a given range, and other governor adjusting means including an element movable to cause the governor to become effective at a speed different from that at which said adjusting device is set, yielding means urging the other governor adjusting means into a position which makes the setting of the governor adjusting device ineffective to control the motor speed, and cam means along the course of the carriage for reacting against the yielding means to control the position of said other governor adjusting means.

3. The combination in a torch carriage, of a motor governor, including a threaded adjustment member and means for setting the adjustment member to control the speed at which the governor becomes effective, a slidable plunger movable to control the governor operation independently of said adjustment member, a collar on the plunger, a spring urging the plunger into a position with the collar in contact with said adjustment member, a bell crank, an adjustable contact screw near the upper end of the bell crank in position to contact with one end of the plunger, a pivot support attached to the torch carriage and comprising the fulcrum for the bell crank, a spring urging the bell crank toward the plunger in opposition to the spring that urges the plunger collar into contact with said adjustment member, and a cam-follower at the lower end of the bell crank for cooperation with a cam located along the course of the carriage to cause the bell crank to occupy different positions and by such movement of the bell crank to cause the plunger to move into different positions during the travel of the carriage along its course.

4. A self-propelled torch carriage including a motor, a governor for controlling the motor speed, and governor adjusting means including a cam-follower biased in one direction and constructed and arranged to be moved or held against the bias by a cam extending lengthwise of the course of the carriage.

5. The combination of a self-propelled torch carriage including a motor, and a governor for the motor, a track along which the carriage runs, control means associated with the governor and operable to change the speed at which the governor becomes effective, a cam-follower included in said control means, and a cam extending lengthwise along the track and having sloped portions for causing the cam-follower to change the position of the governor control means at different regions lengthwise of the track.

6. The combination of a torch carriage having wheels on both sides for stably supporting it, and a motor for driving one or more of the wheels, a track on which the carriage runs, a cam extending lengthwise of the track between the wheels and having variations in the level of its top surface, a lever supported by a pivot on the carriage, a cam-follower on one arm of the lever in position to contact with the top surface of the cam, and means operated by the lever to change the motor speed in accordance with variations in the height of the cam.

7. The combination with a self-propelled torch carriage having a motor, of control apparatus for changing the motor speed, and cam-follower means on the carriage constructed and arranged to cooperate with a cam, extending lengthwise of the course of the carriage, for operating said control apparatus to change the motor speed.

8. Apparatus for moving a torch along a course at different speeds at predetermined regions along the length of said course, said apparatus including a self-propelled torch carriage having a motor, means on the carriage for controlling the motor speed, a cam extending lengthwise of the course followed by the carriage, a cam-follower on the carriage for cooperating with said cam, and connections through which displacement of the cam-follower operates the means on the carriage for controlling the motor speed.

9. Cross-seam welding apparatus including a carriage for moving a welding torch along the seam, a governor for controlling the speed of movement of the carriage, and governor adjusting means including a cam that causes the carriage to move slowly at the beginning of the weld, and with acceleration as the torch approaches the end of the seam.

10. A cross-seam welder for joining new lengths to a metal strip, including in combination a self-propelled torch carriage, a track for guiding the carriage, a governor on the carriage for controlling the speed at which the carriage moves a torch along the seam to be welded, governor adjusting means supported by the carriage including a cam-follower, a cam extending lengthwise of the track for a distance greater than the width of the strip, said cam having changes in its contour corresponding to torch positions near opposite edges of the strip, one change being of such a nature that it moves the cam-follower in a direction to cause a slow movement of the torch at the start of the welding operation, and the other change being of such a nature that it causes a progressive increase in the speed of movement of the torch as the torch approaches the end of the weld.

11. The combination with a self-propelled torch carriage that moves a welding torch along a seam to be welded, of a governor on the torch carriage, governor adjusting means including a cam-follower, and a cam extending lengthwise along the course of the carriage, said cam having various portions in a definite relation to the seam to be welded, the outline of said cam being such that it causes the torch to move rapidly toward position to start a weld, to slow down near the beginning of the seam so that the torch starts the weld at reduced speed, to accelerate to a given speed after the beginning of the weld, and after the torch has moved at substantially said given speed to a point near the end of the weld, to accelerate during the remainder of the weld.

12. The method of controlling the speed of translation of a torch that is moved along a course by a self-propelled torch carriage equipped with a motor, a governor, and a governor adjustment for controlling the motor speed, which method comprises biasing the governor adjustment to change the speed in one direction, holding the governor adjustment against said bias during travel of the carriage along a part of the length of its course, and increasing or decreasing the force exerted against the bias to cause the carriage to move faster or slower at certain regions of its travel.

13. The method of controlling the speed of a motor driven, self-propelled torch carriage with means on the torch carriage for controlling the motor speed, which method comprises applying to the speed control means a constant force that tends to shift said means in one direction, and applying a variable displacement reaction force against said constant force to operate the speed control means and affect the rate of travel during the progress of the carriage along a course.

14. The method of controlling the speed of translation of a torch that is moved along a course by a self-propelled torch carriage equipped with a motor, a governor, and a governor adjustment for controlling the motor speed, which method comprises biasing the governor adjustment to change the speed in one direction, holding the governor adjustment against said bias during travel of the carriage by continuously exerting an opposing force against said bias, and producing variation in the speed of travel of the torch at certain regions during a progressive operation of the torch by varying said opposing force to cause a change in the governor adjustment at the time that the torch approaches said regions.

15. The method of cross-seam welding which comprises moving a welding torch with gradual acceleration at the beginning of the weld, maintaining the speed of travel of the torch substantially constant after it attains a given velocity and until the torch approaches near enough to the end of the weld to reduce the conduction losses from the region of welding, and thereafter accelerating the movement of the torch along the seam until the end of the welding operation.

16. The method of cross-seam welding by means of a welding torch moved by a self-propelled torch carriage, which method comprises driving the carriage rapidly to a position that brings the torch close to the beginning of the seam to be welded, decreasing the carriage speed so that the torch starts the weld at reduced speed, accelerating the torch speed after the start of the weld to a given rate, maintaining the speed of travel of the torch substantially constant at said given rate until the torch approaches near enough to the end of the weld to reduce the conduction losses from the region of welding, and thereafter accelerating the movement of the torch along the seam until the end of the welding operation.

JAMES L. ANDERSON.